Oct. 29, 1929.                D. W. DAVIS                1,733,334
         METHOD AND MEANS OF STORAGE BATTERY ELECTROLYTE CONTROL
                          Filed Oct. 28, 1927

INVENTOR,
Dean W. Davis,
By Minturn & Minturn,
       Attorneys.

Patented Oct. 29, 1929

1,733,334

UNITED STATES PATENT OFFICE

DEAN W. DAVIS, OF ELMHURST, ILLINOIS, ASSIGNOR, BY DIRECT AND MESNE ASSIGNMENTS, TO THOMAS M. HARDY, OF PENDLETON, INDIANA, AND GUSTAV A. SCHNULL, OF INDIANAPOLIS, INDIANA

METHOD AND MEANS OF STORAGE-BATTERY ELECTROLYTE CONTROL

Application filed October 28, 1927. Serial No. 229,502.

This invention relates in general to a storage or secondary battery, and in particular to means for reuniting the gases decomposed from the battery electrolyte in order to maintain automatically a constant volume of the electrolyte without the necessity of having to add water from time to time as has heretofore been necessary.

The invention is described with reference being made to the accompanying drawing, in which—

Figure 1:
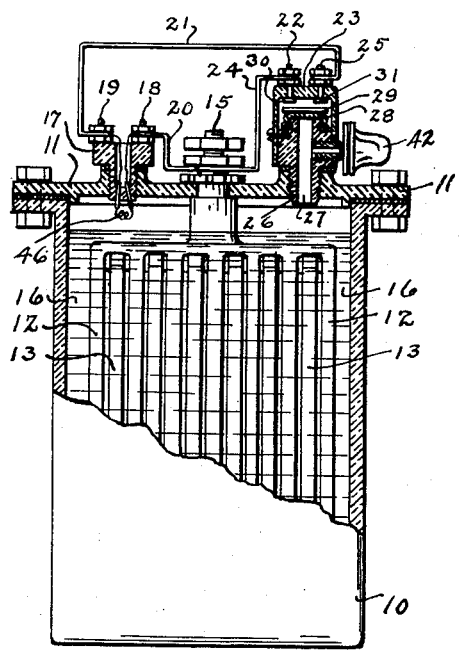
Figure 2:
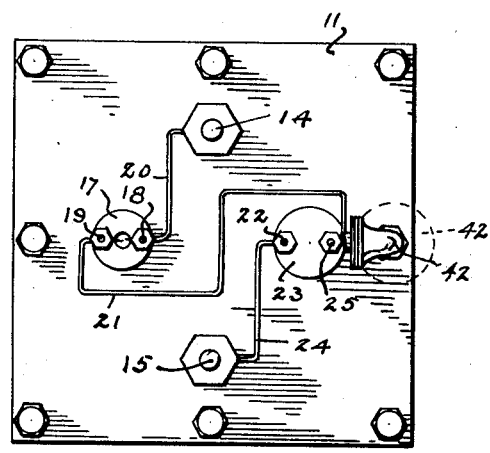
Figure 3:
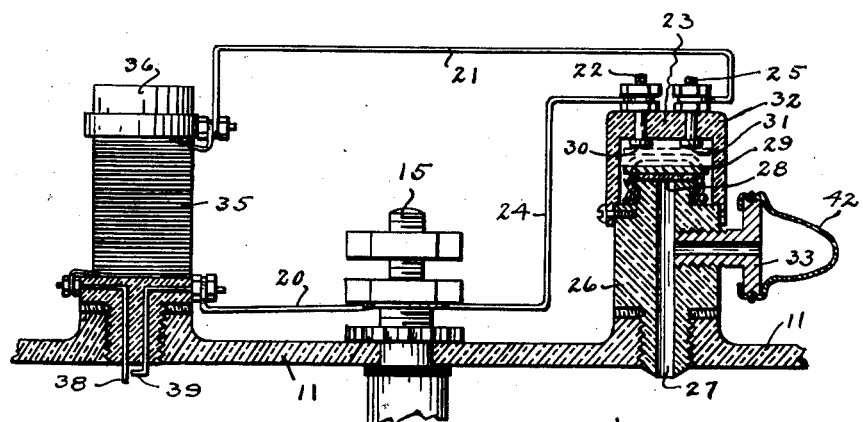
Figure 4:
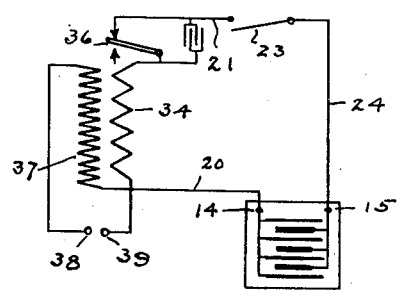

Fig. 1, is a fragmentary vertical section through a battery cell embodying my invention;

Fig. 2, a top plan view of the battery cell;

Fig. 3, an enlarged fragmentary detail in vertical section of the cell cover and attached parts with a modified form of gas igniter; and Fig. 4, a wiring diagram of the form as indicated in Fig. 3.

Like characters of reference indicate like parts throughout the several views of the drawing.

The invention is shown by the drawing as being applied to a single cell battery comprising the jar 10, the cover 11 fitted and secured to the jar 10 so as to prevent the escape of gases therefrom, and the usual positive and negative lead plates 12 and 13 interconnected respectively to the positive and negative terminals 14 and 15 which project through and externally from the cover 11. An electrolyte 16 composed of dilute sulphuric acid surrounds the plates 12 and 13 in the usual and well known manner.

Principally during the operation of charging the cell, the water of the electrolyte is decomposed and the resulting hydrogen and oxygen gases were heretofore liberated, but in my invention are confined within the cell by reason of the tight cover 11. These gases accumulate within the cell until, after continued charging, principally, a pressure above atmospheric is produced. The problem is to cause these gases to reunite, lower the pressure, and by the union of the hydrogen and oxygen, to form water to restore the electrolyte with its original volume of water.

Referring to Fig. 1, 1 insert a short length of resistance wire 46 to within the cell by means of a carrying plug 17 having the terminals 18 and 19 between which the wire 46 is in circuit. A wire 20 interconnects the plug terminal 18 with the cell terminal 14, and a wire 21 leads from the other plug terminal 19 to the terminal 25 on the automatic switch 23. A wire 24 leads from the other terminal 22 of the switch 23 to the cell terminal 15.

This switch 23 has a plug 26 screw-threadedly entered into the cap 11, with a central passage 27 opening into the cell and leading upwardly to discharge against a flexible diaphragm 28 secured across the top end of the passage. A metal disc 29 is carried on the diaphragm 28, and spaced above the diaphragm are the contact points 30 and 31 carried by the cap 32, which contacts are the lower ends of the switch terminals 22 and 25.

When there is no pressure within the cell due to accumulated hydrogen and oxygen gases, the diaphragm 28 and disc 29 remain at the normal lower position as shown in Fig. 1, and by the solid lines in Fig. 3, and the points 30 and 31, therefore, are not connected by the disc 29 so that no current flows through the wire 46. However, when the pressure within the cell rises sufficiently to push the diaphragm 28 up to press the disc 29 against the points 30 and 31 as indicated by the dotted lines in Fig. 3, the circuit is closed to cause the current to flow from the cell through the wire 46, which wire is so proportioned as to be thereby heated to incandescence.

The presence of such an incandescent body in the hydrogen gas in the presence of the oxygen, will set the hydrogen to burning with the resultant product of water, and the pressure is reduced to permit the diaphragm 28 and disc 29 to drop back from the points 30 and 31 so as to open up the circuit and prevent further flow of current from the cell until such current is again actually required. In short, there is an intermittent flow of current only as the conditions of the cell may require, and not a constant drain of current.

An expansible bulb 42 carried on the hollow plug 33 is here shown as being in communication with the interior of the cell through the passage 27, and is provided to permit an expansion to prevent an excessive pressure within the cell during the detonation of the gases. The diaphragm 28 is so formed as to close the electric circuit above indicated at pressures but very little above the normal atmospheric pressure within the cell.

Referring to Figs. 3 and 4 in place of the incandescent body means of igniting the hydrogen gas as above described, is shown a spark gap means of igniting the gas. The same switch mechanism as above described is employed and in series with the switch 23 and the cell terminals 14 and 15, are the primary winding 34 of the spark coil 35, and the circuit interrupter 36. The secondary winding 37 of the coil 35 has as its terminals the electrodes 38 and 39 depended within the cell with a gap therebetween across which a spark will jump when the switch 23 is closed to permit current from the cell to flow through the interrupter 36 and winding 34.

While I have here described my invention in minute detail in one particular form, it is entirely obvious that many structural changes may be made without departing from the spirit of the invention, such as, for example, the combining of the ignition means with the switch means in the same plug, or varying the exact structure of the switch, and I therefore do not desire to be limited to the precise structure as shown, nor any more than may be necessitated by the accompanying claims.

I claim:

1. In a secondary cell, an electrolyte, an enclosure to collect and confine gases decomposed from the electrolyte, a pressure controlled mechanism in communication with said enclosure whereby a predetermined pressure of said gases will actuate said mechanism, and means for detonating said gases associated with said mechanism and an expansion chamber closed to the atmosphere associated with the cell to relieve excessive pressures, to prevent escape of the gases and to retain products resulting from said detonating.

2. In a cell, a vessel containing an electrolyte emiting hydrogen and oxygen gases during operation of the cell, means for confining said gases in communication with said vessel, igniting means in the presence of said gases, and a pressure operated switch normally open, said switch being actuated by a predetermined pressure of said confined gases, said igniting means, cell and switch being in an electrical circuit whereby the closure of said switch will permit current to flow from said cell to said igniting means and an expansion chamber closed to the atmosphere and in communication with said confining means to prevent excessive pressures, retain said gases and prevent escape of the water resulting from the combination of said gases by operation of said igniting means.

In testimony whereof I affix my signature.

DEAN W. DAVIS.